Feb. 16, 1926.
T. C. HUTCHINSON
GRAIN SEPARATOR
Filed July 17, 1925
1,573,166
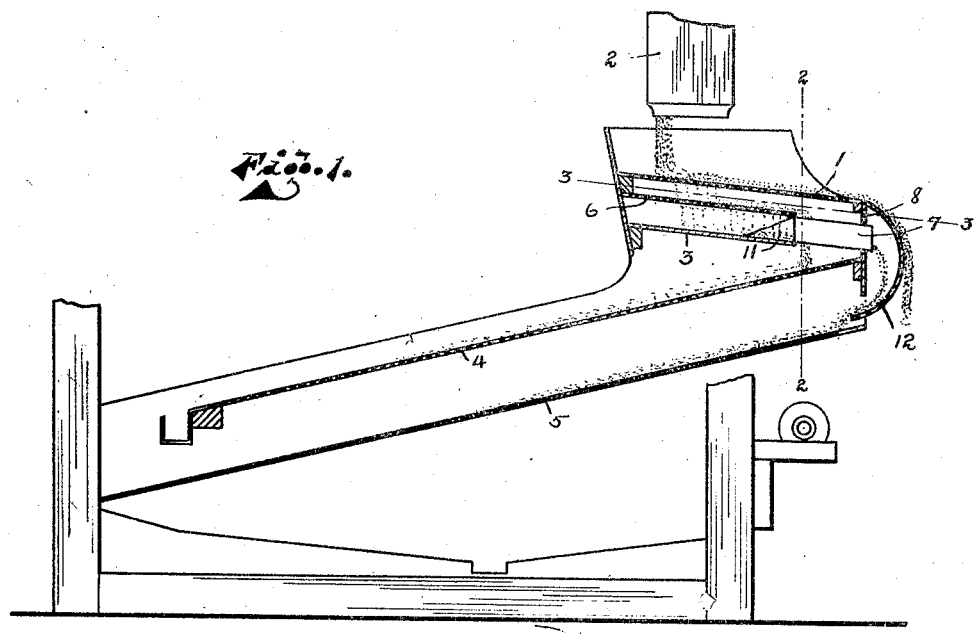
Fig. 1.
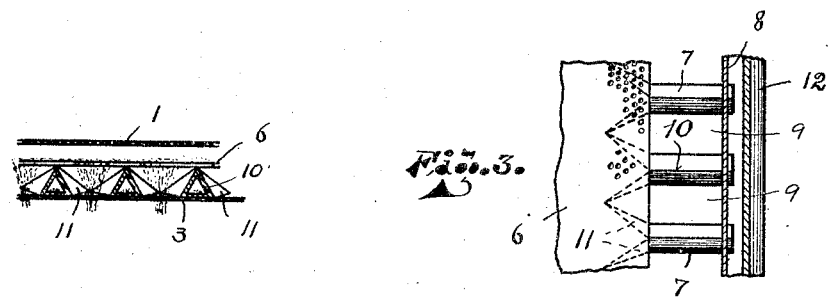
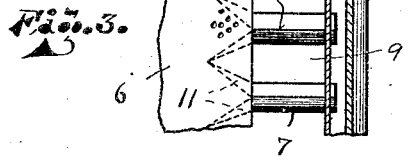
Fig. 2.
Fig. 3.
Inventor
Thos C. Hutchinson.
By
Geo Stevens
Attorney Patented Feb. 16, 1926.

1,573,166

UNITED STATES PATENT OFFICE.

THOMAS C. HUTCHINSON, OF DULUTH, MINNESOTA.

GRAIN SEPARATOR.

Application filed July 17, 1925. Serial No. 44,204.

*To all whom it may concern:*

Be it known that I, THOMAS C. HUTCHINSON, a citizen of the United States, residing at Duluth, in the county of St. Louis and State of Minnesota, have invented certain new and useful Improvements in Grain Separators, of which the following is a specification, reference being had therein to the accompanying drawing.

This invention relates to grain separators and has special reference to an improved arrangement of sieves for such, the principal object being to increase the efficiency of separators as now used by the introduction of an additional sieve.

Other objects and advantages of the peculiar construction and arrangement of parts will appear in the further description of the invention.

Referring now to the accompanying drawing, forming part of this application and in which like reference characters indicate like parts:

Figure 1 is a vertical diagrammatic view of a grain cleaner or separator as common in the art, it having applied thereto my improved auxiliary sieve;

Figure 2 is a partial section on the line 2—2 Figure 1; and

Figure 3 is a partial section on the line 3—3, Figure 1.

In Figure 1 is illustrated the common arrangement of major sieves in a reciprocating or vibrating separator, 1 representing the scalping sieve upon which, for example, wheat and oats are separated from the straw and other foreign substance as they together are discharged downwardly through the feeding spout 2 onto said sieve, the wheat and oats commonly falling through the sieve 1, while the larger material passes on downwardly on said sieve over the lowermost edge thereof.

Spaced beneath the sieve 1 is the blank 3, it being in parallel relation to the sieve 1 and receiving the wheat and oats as they fall from the latter, conveying them downwardly and over the innermost end of said blank 3 where they drop onto the long wheat sieve 4, which is inclined in the opposite direction and through which the wheat is separated from the oats, the former falling therethrough onto the fine seed sieve 5, all of said sieves being of the foraminous sheet metal type, and the arrangement as before stated common in the art.

Now, my improvement resides in installing, intermediate of the scalping sieve 1 and the blank 3, and about equally distant therebetween, an auxiliary wheat sieve 6, which is also parallel with the scalping sieve and the blank, and terminate directly above the termination of the latter. Mounted within the space intermediate of the discharge ends of the auxiliary wheat sieve and the blank are a plurality of parallel inclined covered bridges or passageways 7 for the wheat which is separated from the oats on the auxiliary wheat sieve 6, so that the wheat thus separated may pass over the gap between the terminus of the blank 3 and the front 8 of the separator. The passages 7 are in width about one-third less than the open spaces 9 therebetween and are covered with peaked roofs 10 so that the material not separated upon the auxiliary sieve 6 will pass over the lowermost edge thereof and fall intermediate of the bridges onto the wheat sieve 4 in much the ordinary manner, the bridges forming no obstacle to such passage, and the receiving end of the bridges provided with flaring guiding walls 11 so as to direct as nearly as possible all the wheat separated through this initial fall across the bridges 7, and from thence falling directly downwardly into the crescent shaped apron 12 externally of the front of the machine which directs it onto the fine seed sieve.

In this manner it has been demonstrated that approximately 25% of the wheat may be separated from the oats on the auxiliary sieve 6 and pass, as before described, directly onto the seed sieve, providing that much greater capacity for the wheat sieve, and the capacity of the mill or separator is thus proportionately increased.

It is obvious that such addition to each separator is comparatively inexpensive.

Having thus described my invention, what I claim and desire to secure by Letters Patent, is:

1. The combination with a separator of the type described including a scalping sieve and successively therebeneath, a blank, a wheat sieve, and a fine seed sieve, of an auxiliary sieve intermediate of the scalping sieve and the blank for performing an initial separation of the wheat from the oats, means for passing the wheat thus separated directly upon the fine seed sieve, and means for passing the material not separated from the auxiliary sieve to the long wheat sieve.

2. The combination with a separator of the type described including a scalping sieve and successively therebeneath a blank, a wheat sieve, and a fine seed sieve, of an auxiliary sieve intermediate of the scalping sieve and the blank for performing an initial separation of the wheat from the oats.

In testimony whereof I hereunto affix my signature.

THOMAS C. HUTCHINSON.